(12) United States Patent
Mallick et al.

(10) Patent No.: US 12,555,396 B2
(45) Date of Patent: Feb. 17, 2026

(54) METHOD FOR EXTRACTION OF TABLE AND FIGURE REGION FROM ENGINEERING DRAWINGS

(71) Applicant: L&T TECHNOLOGY SERVICES LIMITED, Chennai (IN)

(72) Inventors: Triptesh Mallick, Bankura (IN); Tarun Kumar Das, Digboi (IN); Mridul Balaraman, Bangalore (IN); Madhusudan Singh, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 286 days.

(21) Appl. No.: 18/531,747

(22) Filed: Dec. 7, 2023

(65) Prior Publication Data

US 2025/0191399 A1    Jun. 12, 2025

(51) Int. Cl.
*G06V 30/18* (2022.01)
*G06T 7/11* (2017.01)
(Continued)

(52) U.S. Cl.
CPC ............ *G06V 30/1801* (2022.01); *G06T 7/11* (2017.01); *G06T 7/13* (2017.01); *G06T 7/155* (2017.01); *G06T 7/194* (2017.01); *G06V 30/18152* (2022.01); *G06V 30/412* (2022.01); *G06V 30/414* (2022.01); *G06V 30/422* (2022.01);
(Continued)

(58) Field of Classification Search
CPC ..... G06T 7/10; G06T 7/11; G06T 7/13; G06T 7/194; G06T 7/155; G06T 5/20; G06T 5/30; G06T 2207/20036; G06V 30/16; G06V 30/168; G06V 30/18; G06V 30/1801; G06V 30/18133; G06V 30/18143; G06V 30/18152; G06V 30/1908; G06V 30/40;
(Continued)

(56) References Cited

U.S. PATENT DOCUMENTS

| | | | |
|---|---|---|---|
| 9,251,413 B2 | 2/2016 | Meier et al. |
| 9,953,008 B2 | 4/2018 | Zaric et al. |
| 9,990,347 B2 | 6/2018 | Raskovic et al. |
| 10,339,212 B2 | 7/2019 | Agrawal et al. |

(Continued)

FOREIGN PATENT DOCUMENTS

| | | |
|---|---|---|
| CN | 108446264 A | 8/2018 |
| CN | 108470021 A | 8/2018 |

(Continued)

*Primary Examiner* — Scott A Rogers
(74) *Attorney, Agent, or Firm* — Kendal M. Sheets

(57) ABSTRACT

A system and method of extracting tables and figures from a drawing document is disclosed. The method may include processing coloured image to segmented binary image and extracting a plurality of horizontal lines and a plurality of vertical lines from a foreground of the image. The method may further include detecting a set of candidate table region from the plurality of horizontal lines and the plurality of vertical lines in the image. Further, the method may include calculating textual region density corresponding to each of the set of candidate table regions in the image. The method may further include identifying at least one relevant table region from the set of candidate table regions in the image and a text free region from the at least one additional region in the image. The method may further include identifying at least one figure region from the dilated text free region.

15 Claims, 16 Drawing Sheets

(51) Int. Cl.
  *G06T 7/13* (2017.01)
  *G06T 7/155* (2017.01)
  *G06T 7/194* (2017.01)
  *G06V 30/412* (2022.01)
  *G06V 30/414* (2022.01)
  *G06V 30/422* (2022.01)

(52) U.S. Cl.
  CPC .............. *G06T 2207/10024* (2013.01); *G06T 2207/20036* (2013.01)

(58) Field of Classification Search
  CPC .... G06V 30/41; G06V 30/412; G06V 30/413; G06V 30/414; G06V 30/42; G06V 30/422
  See application file for complete search history.

(56) References Cited

U.S. PATENT DOCUMENTS

| | | | |
|---|---|---|---|
| 10,685,225 B2 * | 6/2020 | Shanmugavel | G06V 30/414 |
| 10,909,686 B2 | 2/2021 | Ho | |
| 11,755,347 B2 * | 9/2023 | Vaindiner | G06T 7/13 |
| | | | 715/762 |
| 11,966,758 B2 * | 4/2024 | Vaindiner | G06T 5/73 |
| 12,394,019 B2 * | 8/2025 | Mallick | G06V 10/46 |
| 2016/0117307 A1 | 4/2016 | Mungi et al. | |
| 2020/0042785 A1 | 2/2020 | Burdick et al. | |

FOREIGN PATENT DOCUMENTS

| | | | | |
|---|---|---|---|---|
| CN | 111881883 A | * | 11/2020 | ........... G06V 10/267 |
| CN | 112380812 A | | 2/2021 | |
| CN | 117671709 A | * | 3/2024 | ............. G06V 30/16 |

* cited by examiner

METHOD FOR EXTRACTION OF TABLE AND FIGURE REGION FROM ENGINEERING DRAWINGS

TECHNICAL FIELD

This disclosure relates generally to method of extracting tables and figures from an image and more particularly to using image processing techniques to extract the table and figure region.

BACKGROUND

Engineering documents can have information in many forms, like Tables, Free Text, Drawings/Figures, Maps, logo, signature etc. Each of these segments have their specific importance in data extraction. Engineering drawings (EDs) are two-dimensional depictions of a workpiece that include geometric as well as textual information such as measurements, tolerances, and applicable norms, which are essential for quality control of the finished workpiece. In document image analysis, the text/graphics separation process aims at segmenting the document into two layers: a layer assumed to contain text—characters and annotations—and a layer containing graphical objects.

Text and graphics can be found in many documents and images. Graphics oriented at various angles may be interspersed with tables and text oriented at various angles in the engineering drawings. The ability to recognize and/or separate text, tables and graphics in a document and its image is useful in a wide range of applications. For example, text recognizers (also known as optical character recognition or OCR systems). Engineering drawings require some form of preprocessing before applying more advanced methods like dilation, erosion. One of the basic and essential preprocessing methods is binarization which is conversion of a document image into bi-level document image, i.e. image pixels are separated into collection of black and white pixels.

As such, there is a need in the art to provide a cost efficient and effective system and method for segregating table and figure region from an image of the engineering drawings.

SUMMARY OF THE INVENTION

In accordance with an embodiment, a method for extracting table and figure region from an image is disclosed. The method includes processing the image that corresponds to a segmented binary image for extracting a plurality of horizontal lines and a plurality of vertical lines from a foreground of the image. The method further includes detecting a set of candidate table regions based on intersection of lines from the plurality of horizontal lines and the plurality of vertical lines in the image using a morphological technique. The method further includes calculating textual region density corresponding to each of the set of candidate table regions in the image, based on computation of text area and computation of area of each of the set of candidate table regions. The method further includes identifying at least one relevant table region from the set of candidate table regions in the image, based on the textual region density being above a pre-defined threshold value. The method further includes identifying at least one additional region in the image, based on the textual region density being below or equal to the pre-defined threshold value. It should be noted that the at least one additional region may be different from the at least one relevant table region. The method further includes identifying a text free region from the at least one additional region in the image, based on extracting at least one textual region in the at least one additional region. It may be noted that the text free region may be dilated using a morphological technique. The method further includes identifying at least one figure region from the dilated text free region, using a contour-based detection technique.

In accordance with another embodiment, a system for extracting table and figure region from an image is disclosed. The system may include a processor and a memory communicatively coupled to the processor. The memory may store processor-executable instructions, which, on execution, causes the processor to process the image that corresponds to a segmented binary image for extracting a plurality of horizontal lines and a plurality of vertical lines from a foreground of the image. The processor-executable instructions may further cause the processor to detect a set of candidate table regions based on intersection of lines from the plurality of horizontal lines and the plurality of vertical lines in the image using a morphological technique. The processor-executable instructions may further cause the processor to calculate textual region density corresponding to each of the set of candidate table regions in the image, based on computation of text area and computation of area of each of the set of candidate table regions. The processor-executable instructions may further cause the processor to identify at least one relevant table region from the set of candidate table regions in the image, based on the textual region density being above a pre-defined threshold value. The processor-executable instructions may further cause the processor to identify at least one additional region in the image, based on the textual region density being below or equal to the pre-defined threshold value. It should be noted that the at least one additional region may be different from the at least one relevant table region. The processor-executable instructions may further cause the processor to identify a text free region from the at least one additional region in the image, based on extracting at least one textual region in the at least one additional region. It may be noted that the text free region may be dilated using a morphological technique. The processor-executable instructions may further cause the processor to identify at least one figure region from the dilated text free region, using a contour-based detection technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Figure 1:
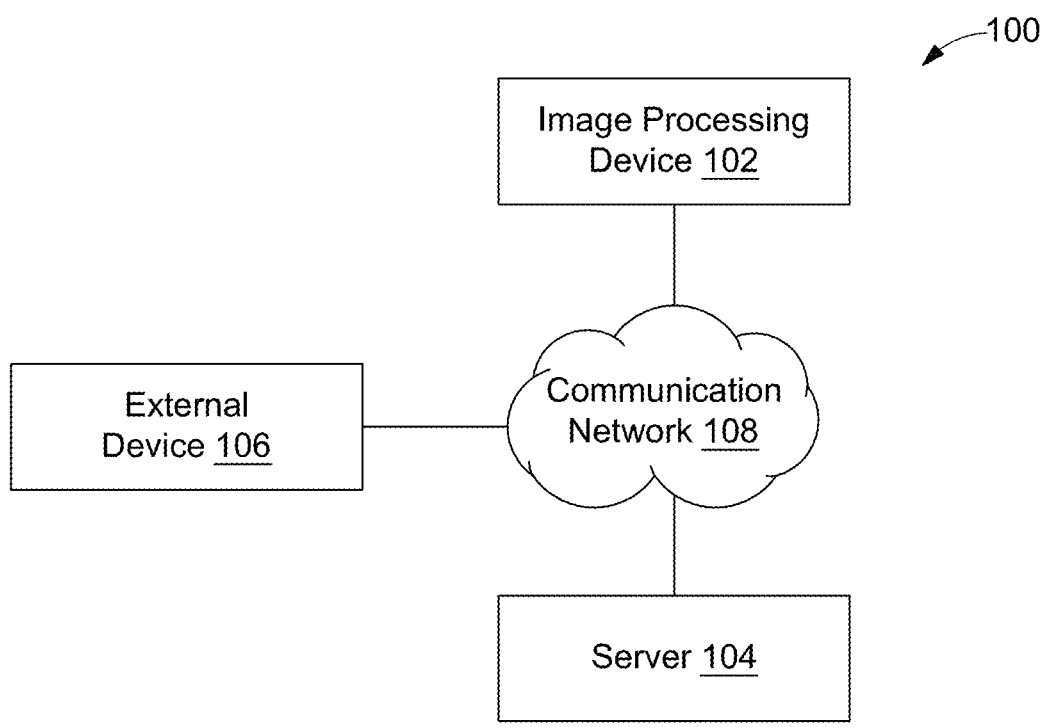
FIG. 1 is a block diagram illustrating a system for extracting tables and figures from an image of engineering drawing document is illustrated, in accordance with an embodiment of the disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following described implementations may be found in the disclosed method and system for extracting table and figure regions from engineering drawing documents based on an image processing algorithm. The table region in the engineering drawing documents may include textual information and the figure region may include geometrical features. Therefore, the disclosed system and method may provide a unique solution to segregate the table region and the figure region from the drawing document using the image processing algorithm, thereby reducing difficulty in retrieving segregated content from the drawing documents.

Referring to FIG. 1, is a block diagram of a system 100 for extracting tables and figures from an image of engineering drawings is illustrated, in accordance with an embodiment. The system 100 may include an image processing device 102, a server 104, an external device 106, and a communication network 108. In accordance with an embodiment, the image processing device 102 may be configured to extract tables and figures from the image.

The image processing device 102 may be communicatively coupled to the server 104 and the external device 106 via the communication network 108. The image processing device 102 may include image sensors, image processing hardware, image displayer and one or more dedicated computer for processing of the image associated with the engineering drawings. In particular, the image of engineering drawings may be processed to divide the image into meaningful regions i.e., background and foreground regions.

The server 104 may include suitable logic, circuitry, interfaces, and/or code that may be configured to store, maintain, and execute one or more software platforms and programs, such as image modifying software, and one or more databases. Although in FIG. 1, the image processing device 102 and the server 104 are shown as two separate entities, this disclosure is not so limited. Accordingly, in some embodiments, the entire functionality of the server 104 may be included in the image processing device 102, without a deviation from scope of the disclosure.

The external device 106 may include appropriate logic, circuitry, interfaces, and/or code that may be configured to facilitate communication. The communication network 108 may allow the external device 106 to communicate with the image processing system 102. The external device 106 and the image processing device 102 are generally located in different locations. In accordance with an embodiment, the external device 106 may be configured to display the segregated parts of the image. The functions of the external device 106 can be implemented in both portable and non-portable devices, such as a high-speed computing device or an application server. A computing device, a smart phone, a mobile device, a laptop, a smart watch, an MP3 player, a personal digital assistant (PDA), an e-reader, and a tablet are all examples of external device 106.

The communication network 108 may include a communication medium through which the image processing device 102, the server 104, and the external device 106 may communicate with each other. The communication network 108 may be a wired or a wireless network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 2:
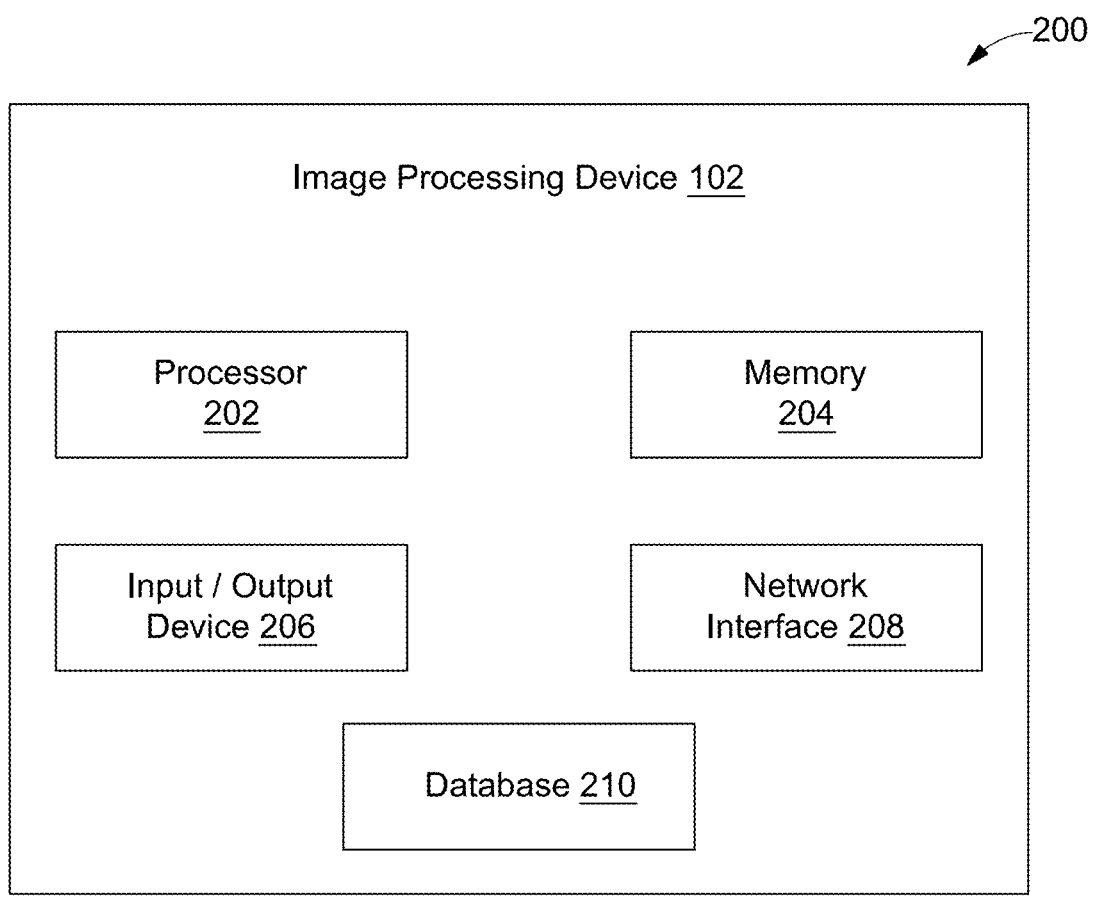
FIG. 2 is a functional block diagram of an image processing device for extracting tables and figures from an image of engineering drawing document is illustrated, in accordance with an embodiment of the disclosure

Referring now to FIG. 2, a functional block diagram 200 of the image processing device 102 is illustrated, in accordance with an embodiment. The image processing device 102 may include a processor 202, a memory 204, an input/output (I/O) device 206, a network interface 208, and a database 210. It may be noted that elements and features of the image processing device 102 may be operatively associated, coupled, or otherwise configured to cooperate with one another as needed to support the desired functionality, as described herein. The various physical, electrical, and logical couplings and interconnections for the elements and features are not depicted in FIG. 2 for clarity and ease of illustration. Furthermore, the subsequent embodiments of the image processing device 102 may include additional elements, modules, and features that work together to provide the desired functionality. FIG. 2 merely depicts certain elements that may be related to the techniques described in greater detail below for clarity.

The processor 202 may include suitable logic, circuitry, interfaces, and/or code, software that may be configured to process user queries, such as, text based, image based, audio based, and audio-visual based communications, using natural language processing (NLP) techniques, video analytics techniques, object content recognition (OCR) techniques. The processor 202 may be implemented based on a number of processor technologies, which may be known to one ordinarily skilled in the art. Examples of implementations of the processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof. The processor 202 may be communicatively coupled to, and communicates with, the memory 204.

The memory 204 may include suitable logic, circuitry, and/or interfaces that may be configured to store instructions executable by the processor 202. Additionally, the memory 204 may be configured to store program code of one or more machine learning models and/or the software application that may incorporate the program code of the one or more machine learning models. The memory 204 may be configured to store any received data or generated data associated with storing, maintaining, and executing the image processing system 102 used to conduct text-based, voice-based, and/or video-based online conversation with one or more users Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card. The memory 204 may further include various modules that enable the image processing device 102 to extract tables and figures from the image. These modules are explained in detail in conjunction with FIG. 3.

The I/O device 206 may include suitable logic, circuitry, and/or interfaces that may be configured to act as an I/O interface between a user and the image processing device 102. The I/O device 206 may include various input and output devices, which may be configured to communicate with different operational components of the image processing device 102. The I/O device 206 may be configured to communicate data between the image processing device 102 and one or more of the servers 104, and the external device 106.

The I/O device 206 may act as an I/O interface between the user and the image processing device 102. As described in more detail below, data received by the I/O device 206 may include, without limitation: text-based, image based, voice-based, and/or video-based messages from the user and other data compatible with the image processing device 102. Data provided by the I/O device 206 may include, without limitation, user query response(s), and the like. Examples of the I/O device 206 may include, but are not limited to, a touch screen, a keyboard, a mouse, a joystick, a microphone, and a display screen.

The network interface 208 may include suitable logic, circuitry, interfaces, and/or code that may be configured to facilitate different components of the image processing device 102 to communicate with other devices, such as the server 104, and the external device 106 in the system 100, via the communication network 108. The network interface 208 may be configured to implement known technologies to support wired or wireless communication. Components of the network interface 208 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VOIP), Wi-MAX, Internet-of-Things (IoT) technology, Machine-Type-Communication (MTC) technology, a protocol for email, instant messaging, and/or Short Message Service (SMS).

The database 210 may include suitable logic, circuitry, and/or interfaces that may be configured to store program instructions executable by the processor 202. The database 210 may include a computer-readable storage media for carrying or having computer-executable instructions or data structures stored thereon. Such computer-readable storage media may include any available media that may be accessed by a general-purpose or special-purpose computer, such as the processor 202.

By way of example, and not limitation, the database 210 may use computer-readable storage media that includes tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Figure 3:
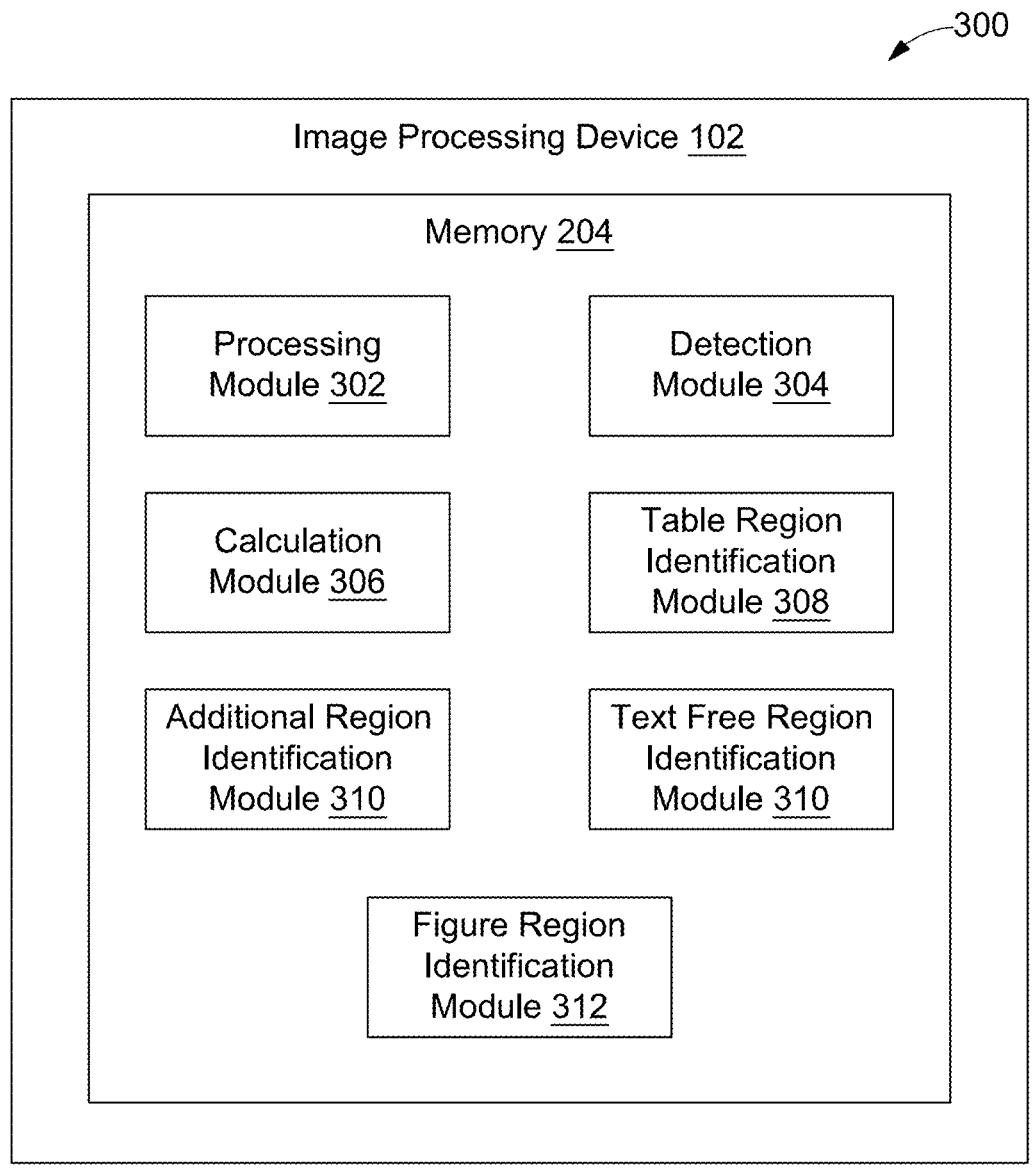
FIG. 3 is a block diagram that illustrates various modules within a memory of an image processing device for extracting tables and figures from an image of engineering drawing document, in accordance with an embodiment of the disclosure.

Referring now to FIG. 3, a block diagram 300 of various modules within the memory 204 of the image processing device 102 configured to extract tables and figures from an image of engineering drawing document is illustrated, in accordance with an embodiment. The memory 204 may include a processing module 302, a detection module 304, a calculation module 306, a table region identification module 308, an additional region identification module 310, a text free region identification module 312, and a figure region identification module 314.

In order to extract the tables and figures from the image, initially, a colored image may be received from a drawing document. Examples, of the colored image may include, but are not limited to, a red color image, a green color image, a blue color image, and the like. The drawing document may include one or more drawings of engineering objects having different shapes and size. The engineering drawings may include graphical information in many different forms, for example, but are not limited to, tables, texts, figures, maps, logo, signatures, and the like. Each of the graphical information may have specific significance in data extraction. Therefore, the image processing device 102 may distinguish each of the graphical information using an image processing algorithm.

Once the colored image is received, the image processing device 102 may convert the colored image into a binary image. The binary image may be, for example, a black and white image of the engineering drawings. Further, the binary image may be segmented into a foreground (white) and a background (black) based on an adaptive threshold value.

With reference to FIG. 3, the processing module 302 may be configured to processed a segmented binary image for extracting a plurality of horizontal lines and a plurality of vertical lines from the foreground of the image. Further, the detection module 304 may detect a set of candidate table regions based on intersection of lines from the plurality of horizontal lines and the plurality of vertical lines in the image. It may be noted that the set of candidate table regions may be detected using a morphological technique.

Once the set of candidate table regions are detected, the calculation module 306 may calculate textual region density corresponding to each of the set of candidate table regions in the image. In some embodiments, the textual region density may be calculated based on computation of text area and computation of area of each of the set of candidate table regions. Further, the table region identification module 308 may be configured to identify at least one relevant table region from the set of candidate table regions in the image, based on the textual region density being above a pre-defined threshold value. In some embodiments, a plurality of table cells may be detected from the at least one relevant table region using a contour-based cell detection technique. It may be noted that the intersection of lines from the plurality of horizontal lines and the plurality of vertical lines in the image is indicative of table cells.

Based on the textual region density being below or equal to the pre-defined threshold value, the additional region identification module 310 may identify at least one additional region in the image. It should be noted that the at least one additional region may be different from the at least one relevant table region. Once the at least one additional region is identified, then the text free region identification module 312 may identify a text free region from the at least one additional region in the image, based on extracting at least one textual region in the at least one additional region. In some embodiments, the text free region may be dilated. It will be apparent to a person skilled in the art that the free region may be dilated using an open source image processing algorithm i.e., using a morphological technique. The morphological technique may include dilation and erosion.

Further, the figure region identification module 314 may be configured to identify at least one figure region from the dilated text free region. The at least one figure region may be identified using a contour-based detection technique. Thus, by employing aforementioned modules 302-314, the table region and the figure region may get extracted from the image of engineering drawings document.

It should be noted that all such aforementioned modules 302-314 may be represented as a single module or a combination of different modules. Further, as will be appreciated by those skilled in the art, each of the modules 302-314 may reside, in whole or in parts, on one device or multiple devices in communication with each other. In some embodiments, each of the modules 302-314 may be implemented as dedicated hardware circuit comprising custom application-specific integrated circuit (ASIC) or gate arrays, off-the-shelf semiconductors such as logic chips, transistors, or other discrete components. Each of the modules 302-314 may also be implemented in a programmable hardware device such as a field programmable gate array (FPGA), programmable array logic, programmable logic device, and so forth. Alternatively, each of the modules 302-314 may be implemented in software for execution by various types of processors (e.g., processor 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for extracting tables and figures from an image. For example, the system 100 and the associated image processing device 102 may extract tables and figures from image by the processes discussed herein. In particular, as will be appreciated by those of ordinary skill in the art, control logic and/or automated routines for performing the techniques and steps described herein may be implemented by the system 100 and the associated image processing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
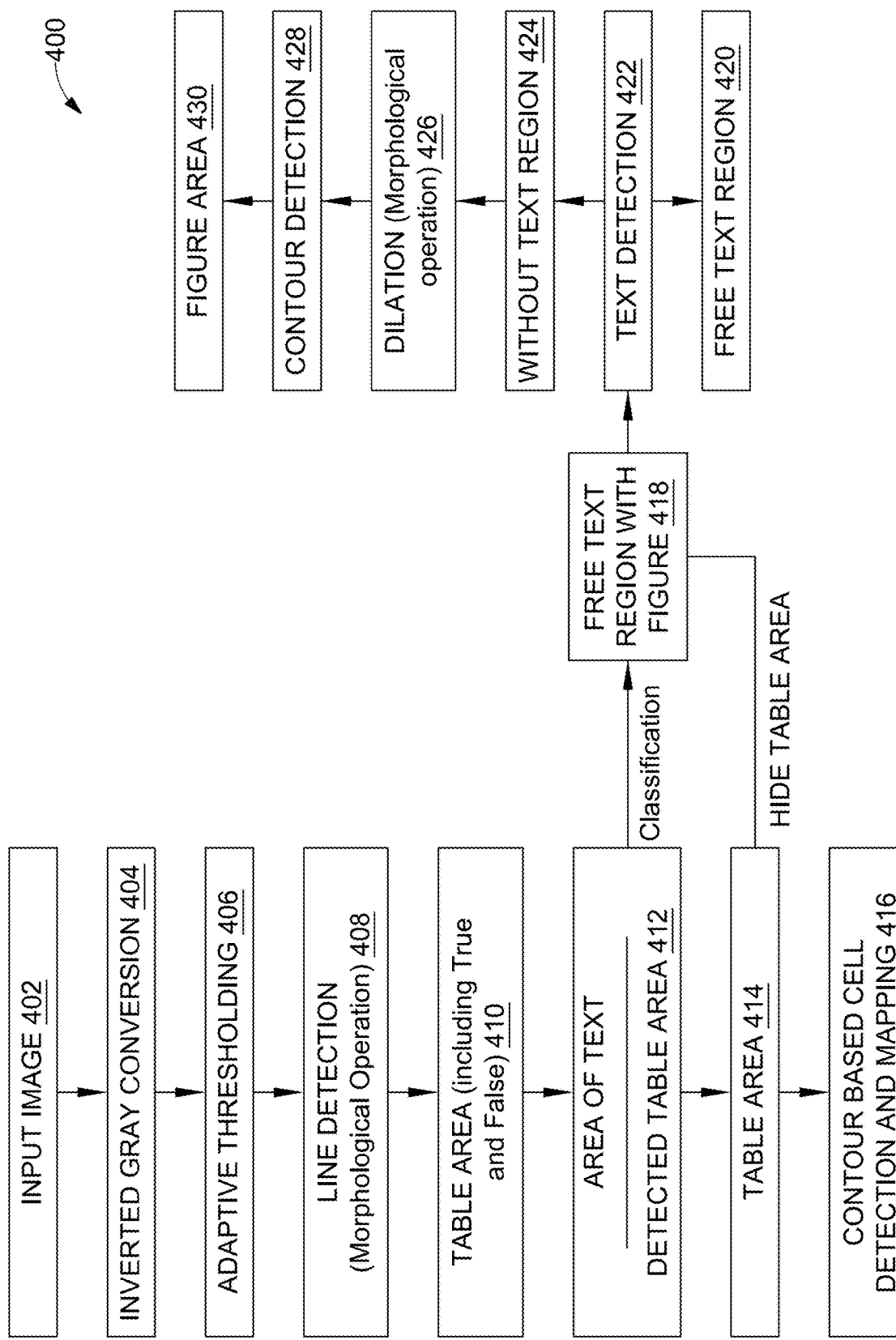
FIG. 4 illustrates a process flow for extracting table and figure regions from an image of engineering drawing document, in accordance with an embodiment of the disclosure.

Referring now to FIG. 4, a process flow for extracting table region and figure region from an image of engineering drawing document is illustrated, in accordance with an embodiment. At step 402, an input image from the engineering drawing document may be received by the processor 202. The input image may be a multicolored image i.e., a combination of red, green, and blue colored image.

Figure 5:
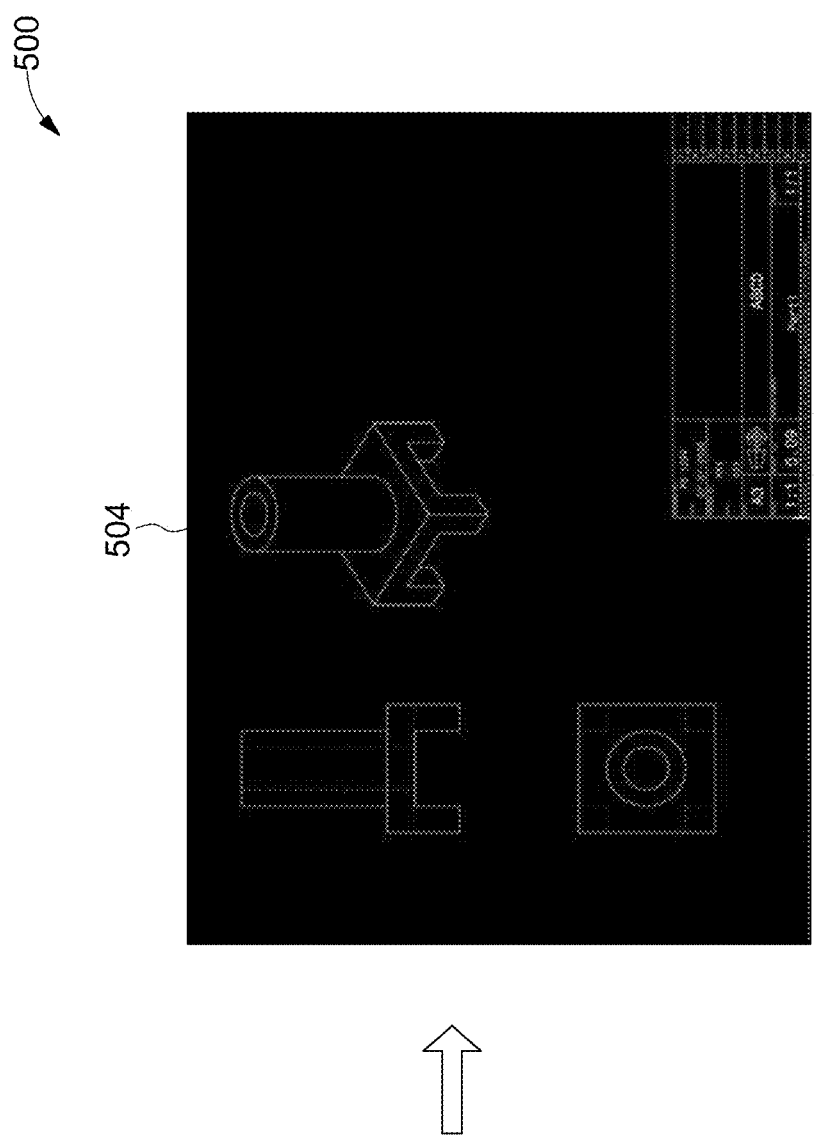
FIG. 5 illustrates an exemplary image of engineering drawing document depicting conversion of multicolor image into binary image, in accordance with an embodiment of the disclosure.
Figure 5:
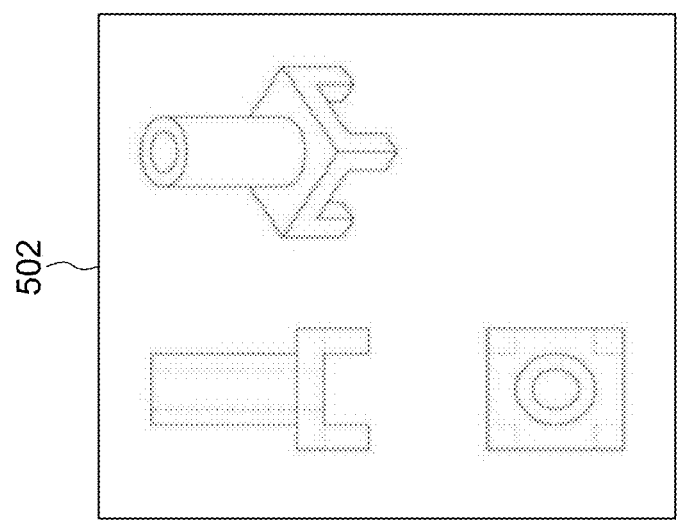

Once the input image is received, at step 404 the input image may further be converted into a grey scale image. The gray scale image is a digital image made up of an array of pixels, each of which is represented by a number that indicates the pixel's grey level (for example, darkness or lightness). The grey scale image may be a binary image that is black and white in color. For example, as shown in FIG. 5, a conversion of a multicolor image 502 into a binary image 504 is illustrated via an exemplary image 500. The process of conversion may include analyzing pixel information of an original color image file. Upon analyzing, converting the original color image into a non-color image or the binary image 504.

Figure 6:
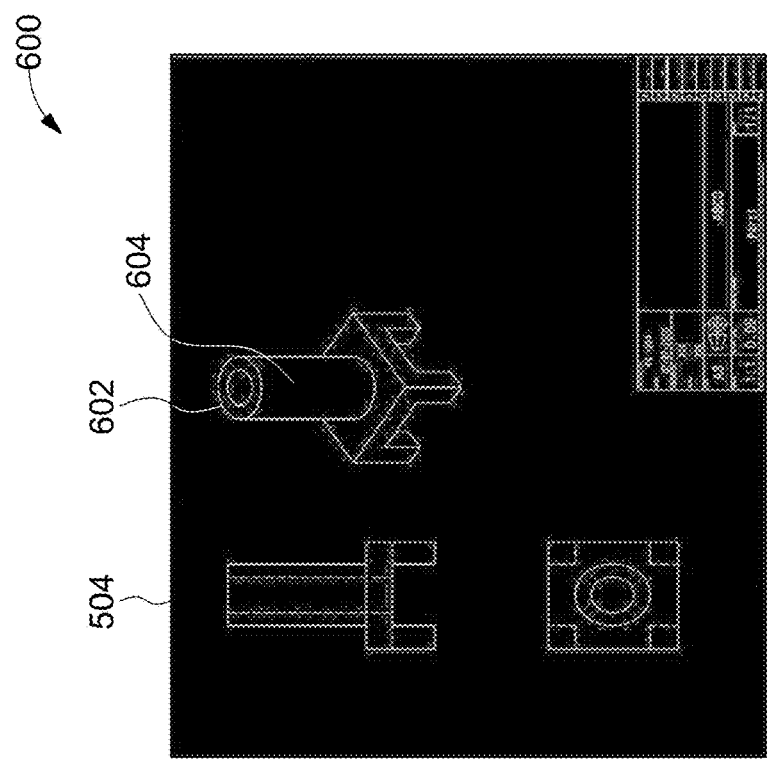
FIG. 6 illustrates an exemplary image of engineering drawing document depicting classification of foreground region and background region using adaptive thresholding technique, in accordance with an embodiment of the disclosure.
Figure 6:
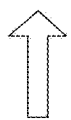
Figure 6:
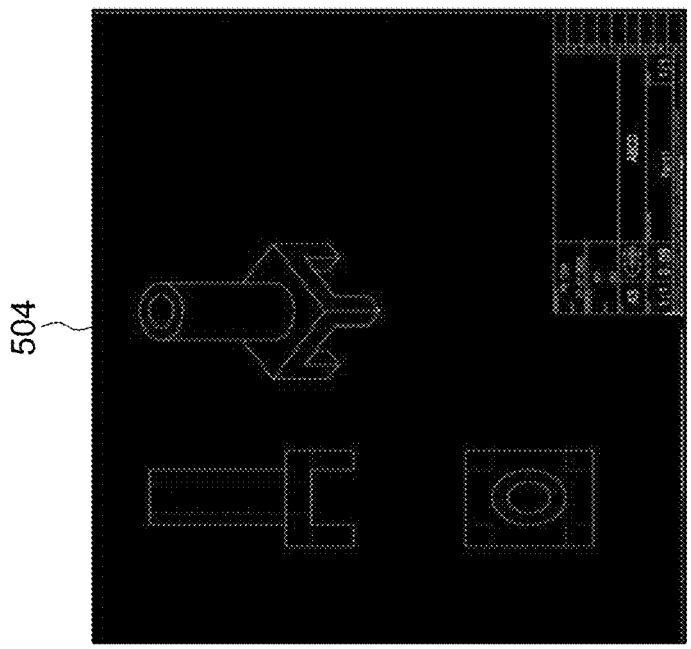

Referring back to FIG. 4, at step 406, desirable foreground region may be separated from a background region using an adaptive thresholding technique, based on a difference in pixel intensities of each region of converted grey image. As depicted via an exemplary image 600 of engineering drawing document of FIG. 6, classifying foreground region 602 and background region 604 of the binary image 504 by applying the adaptive thresholding technique. The process of classification may include determining a threshold value of each pixel position of the grey scale image or the binary image 504. Upon determining the threshold value, classifying all the gray level in a scale of 1 or 0. In particular, the grey level value which is equal to or greater than the threshold value may be classified as 1 (white-foreground) based on a predefined-threshold value. Additionally, all the gray level value which is below a selected threshold value may be classified as 0 (black-background).

Figure 7:
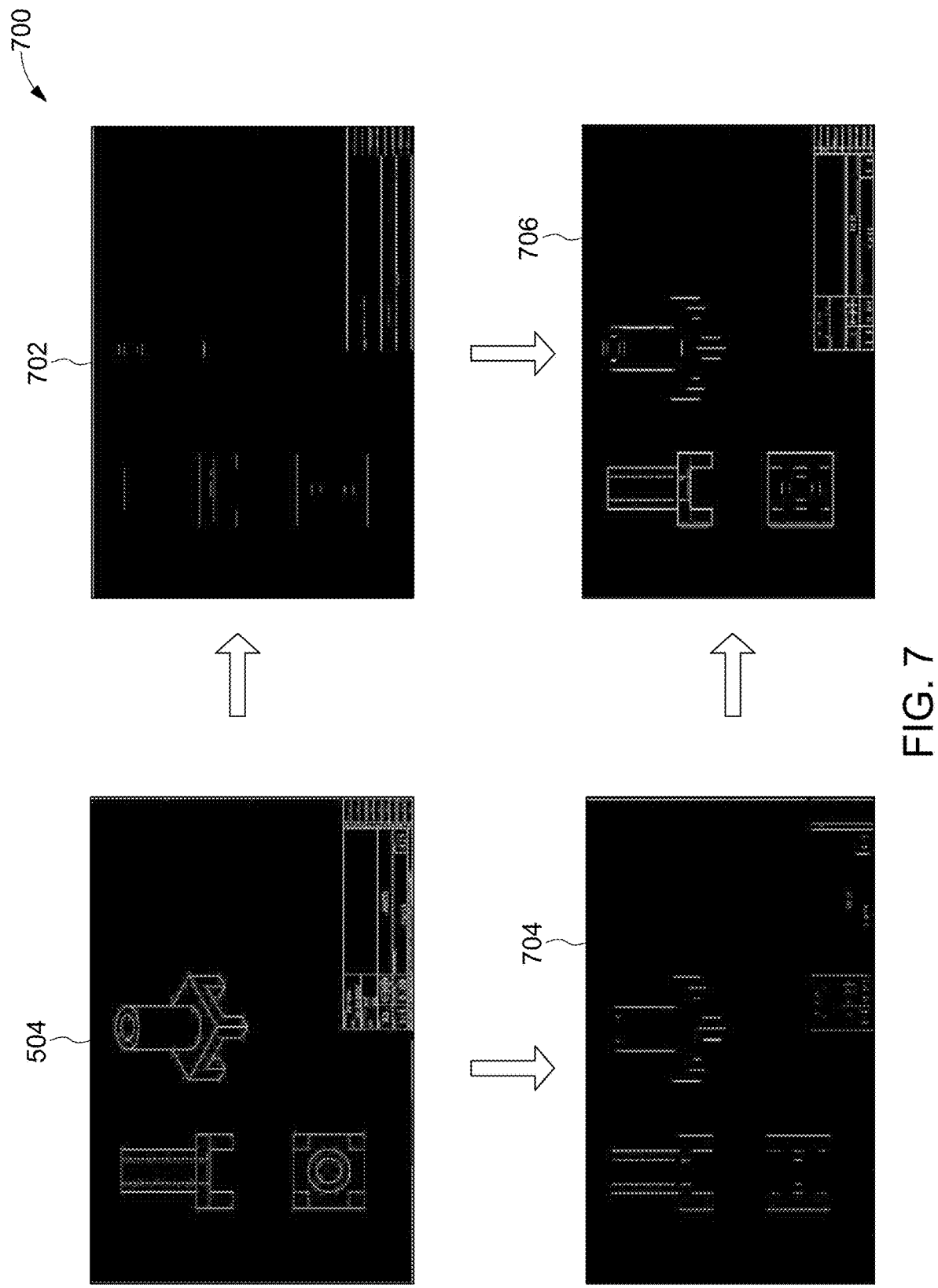
FIG. 7 illustrates an exemplary image of engineering drawing document depicting line detection within the image using morphological technique, in accordance with an embodiment of the disclosure.

Further, at step 408, a plurality of horizontal lines and a plurality of vertical lines may be detected from a foreground region of the binary image using a morphological technique. For example, as illustrated in FIG. 7, an exemplary image 700 depicts detection of horizontal lines 702 and vertical lines 704 from the binary image 504 using the morphological technique. In the morphological technique, the plurality of vertical lines 704 and the plurality of horizontal lines 702 may be extracted from the binary image 504 using dilation and erosion operation based on kernels. Further, each of the images associated with plurality of vertical lines 704 and the plurality of horizontal lines 702 may be combined together to form a combined image 706.

Figure 8:
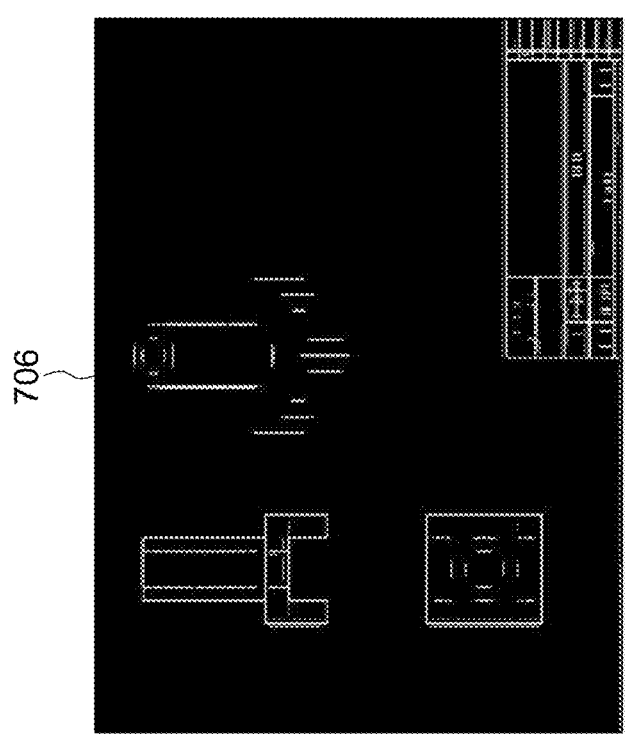
FIG. 8 illustrates an exemplary image of engineering drawing document depicting detection of table region, in accordance with an embodiment of the disclosure.
Figure 8:
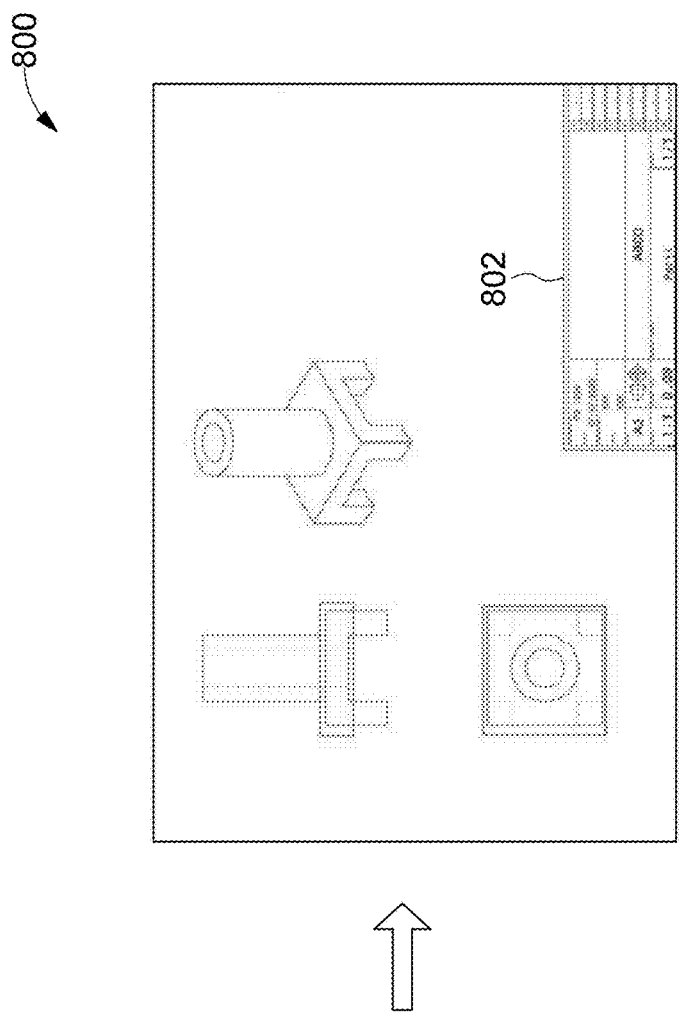

At step 410, based on a pre-defined threshold value, a relevant table region may be detected from a set of candidate table regions in the image which is further processed to identify at least one additional region from the image. It may be noted the identified at least one additional region is different from the relevant table region. This is further explained in conjunction with FIG. 16. For example, as represented in FIG. 8, an exemplary image 800 depicts detection of a relevant table region 802 from the combined image 706 associated with the binary image is illustrated. It may be noted that, intersecting of horizontal lines and vertical lines may create table cells, which may include some false table cells due to similar nature, as shown in the FIG. 8.

Figure 9:
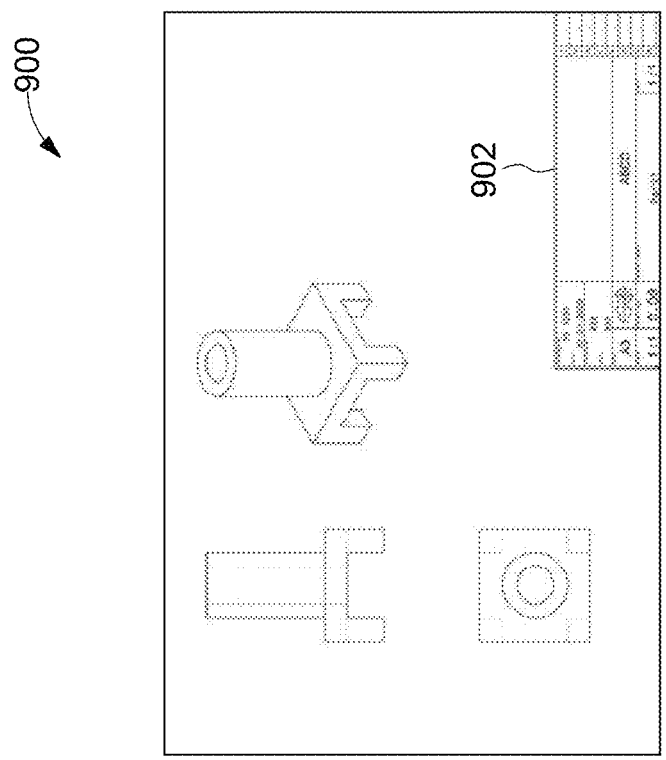
FIG. 9 illustrates an exemplary image of engineering drawing document depicting classification of a true table region, in accordance with an embodiment of the disclosure.
Figure 9:
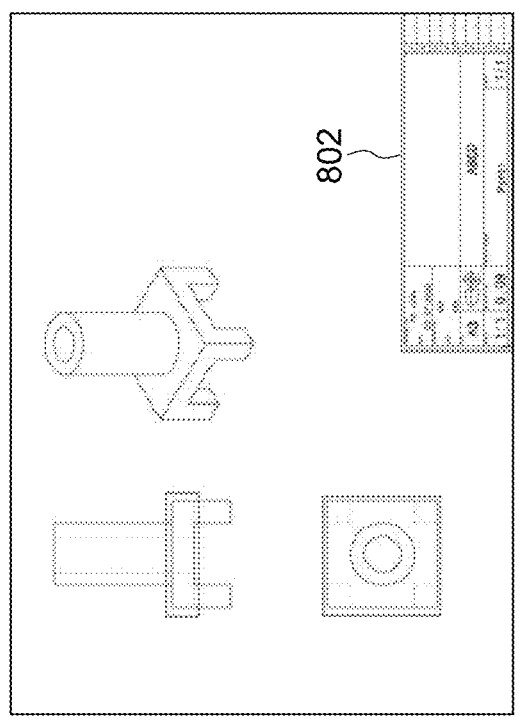
Figure 10:
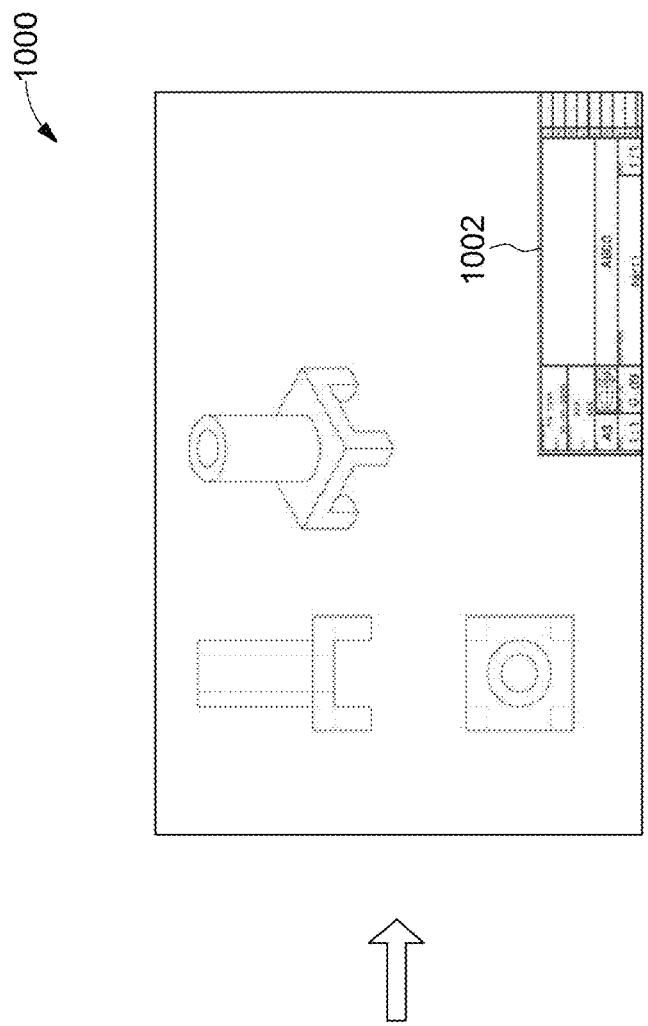
FIG. 10 illustrates an exemplary image of engineering drawing document depicting contour-based cell detection from classified true table region, in accordance with an embodiment of the disclosure.

Further, at step 412 the relevant table region 802 (with true and false table cells) may further be classified as a true table region 902 (with include only true table cells), as shown in FIG. 9. At step 414, the detected relevant table region may further be processed. At step 416, a contour-based cell detection technique may be used to extract table cells from the true table region and further mapping may be performed. The extraction of table cells 1002 from the true table region 902 of exemplary image 1000 using contour-based cell detection is depicted via FIG. 10.

Figure 11:
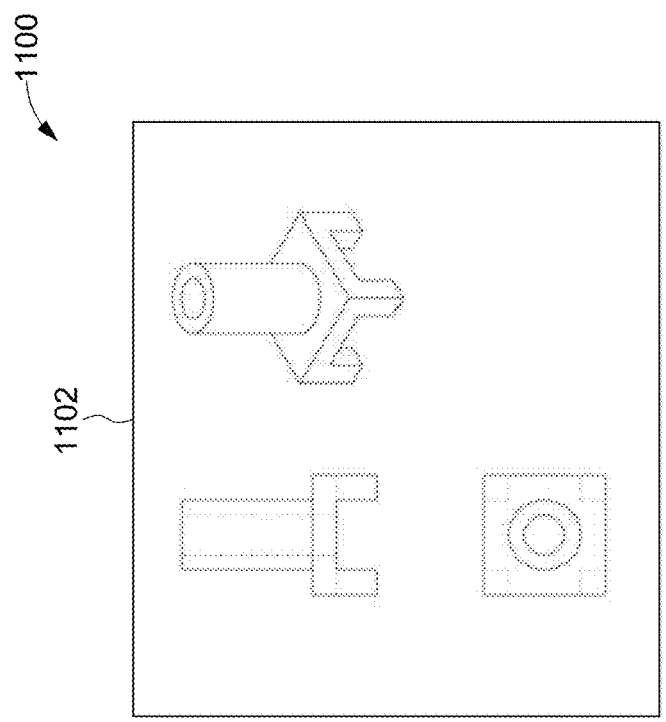
FIG. 11 illustrates an exemplary image of engineering drawing document depicting hiding of the true table region, in accordance with an embodiment of the disclosure.
Figure 11:
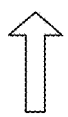
Figure 11:
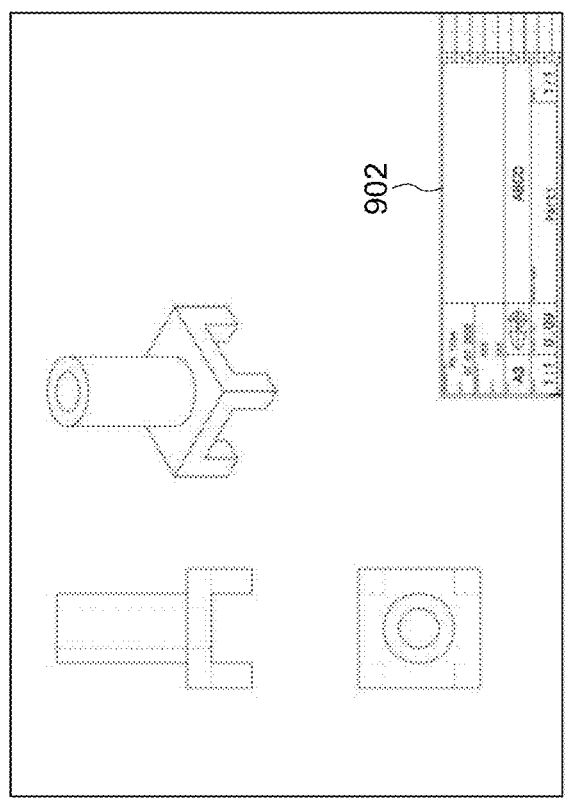
Figure 12:
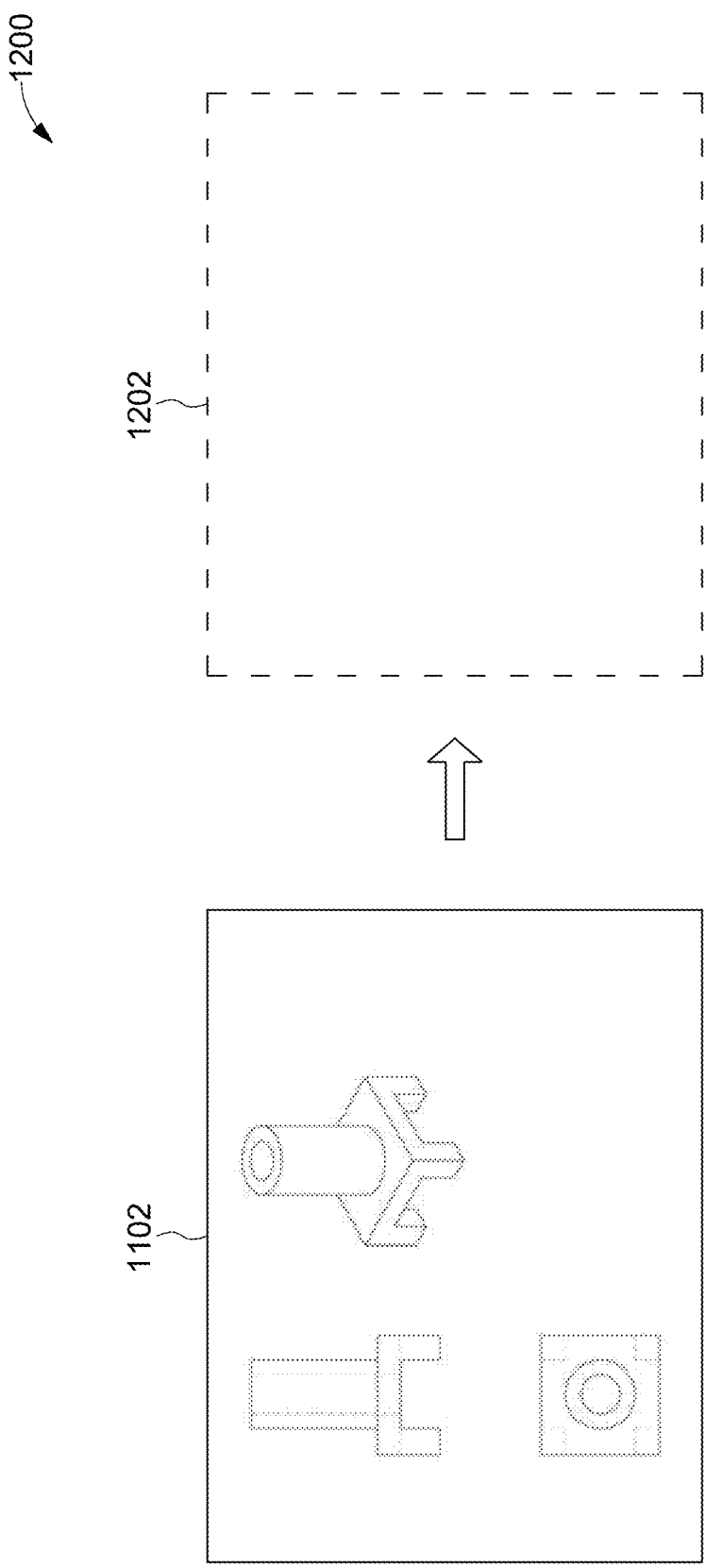
FIG. 12 illustrates an exemplary image of engineering drawing document depicting extraction of text region from the image, in accordance with an embodiment of the disclosure.

In some embodiments, the table region detected may be hidden. For example, as shown in FIG. 11, depicts hiding 1102 of the true table region 902 from an exemplary image 1100 of engineering drawing document is illustrated. Further, at step 418, a text free region along with figure from the image may be identified. At step 420, the identified text region may be processed. At step 422, all the text from the image may be extracted. For example, FIG. 12 depicts an exemplary image 1200 having hidden 1102 or text free region with included figure and the exemplary image 1200 with all the text extracted without included FIG. 1202. The process may include detecting and extracting all the text from the exemplary image 1200 using optical character recognition (OCR) technique. For example, the OCR technique may perform a dual step procedure for detecting and extracting text from an image. In a first step, a text detection may be performed which may determine a textual portion of the image. Text localization within the image may be critical for a second step of the OCR technique that may include performing a text recognition in which the text is extracted from the image.

Figure 13:
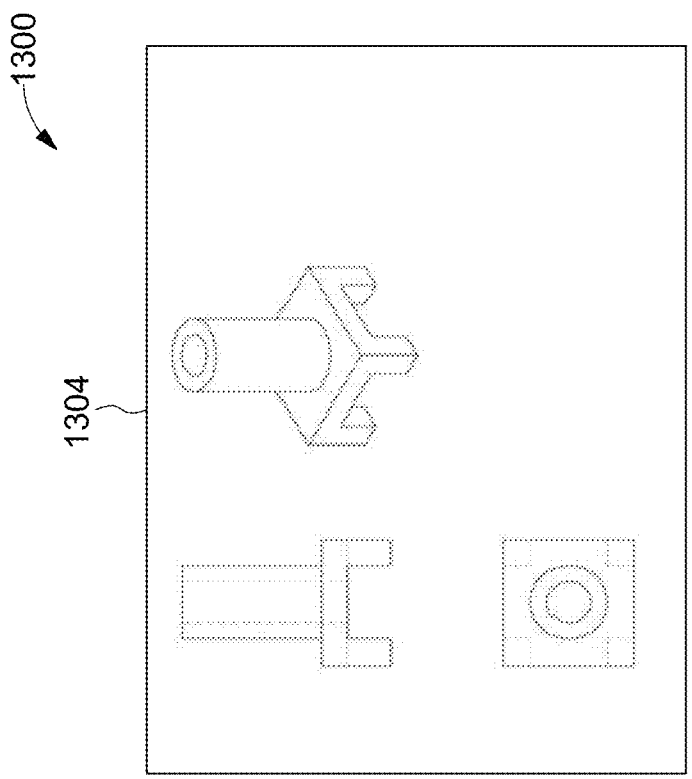
FIG. 13 illustrates an exemplary image of engineering drawing document depicting conversion of text region to text free region, in accordance with an embodiment of the disclosure.
Figure 13:
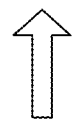
Figure 13:
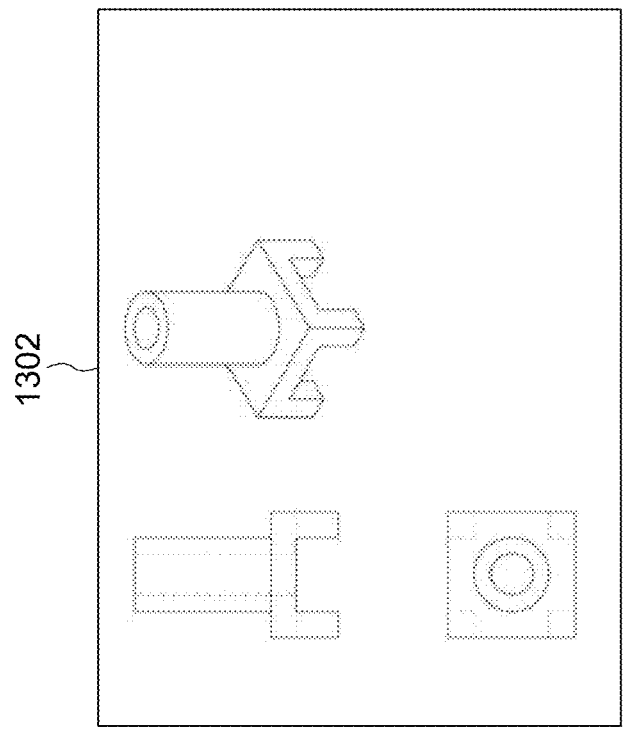
Figure 14:
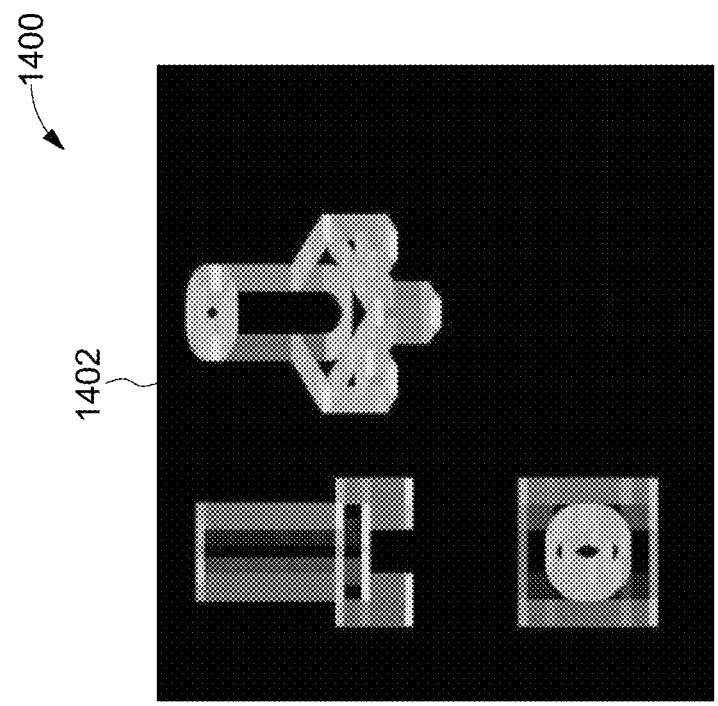
FIG. 14 illustrates an exemplary image of engineering drawing document depicting dilation of the text free region, in accordance with an embodiment of the disclosure.
Figure 14:
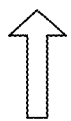
Figure 14:
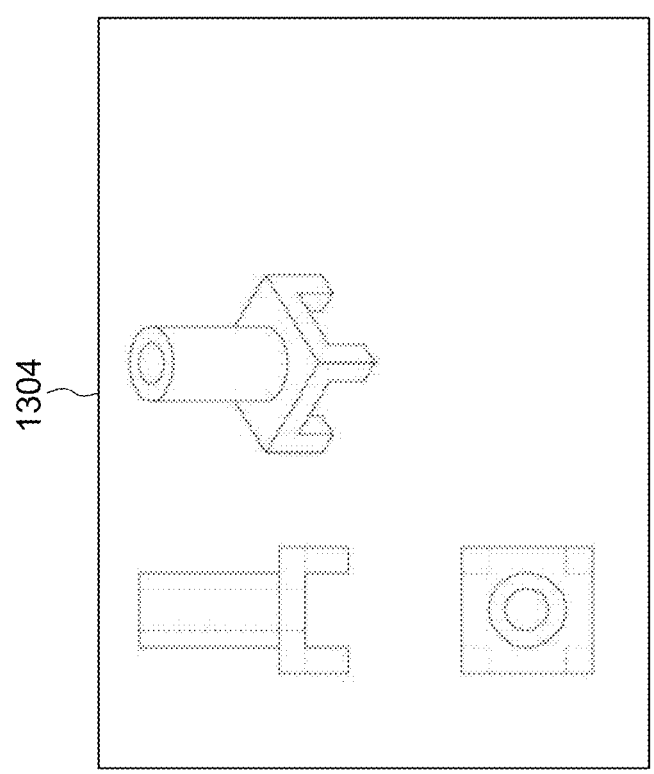

At step 424 the image without text region may be processed. For example, as shown in FIG. 13, an exemplary image 1300 depicting conversion of text region 1302 to a text free region 1304. The process of conversion may include hiding of the textual region 1302 extracted from the exemplary image 1300 to obtain the text free region 1304. Further, at step 426, a text free region may be dilated using an open source image processing algorithm i.e., using morphologic technique. For example, as shown in FIG. 14, an exemplary image 1400 depicting dilation 1402 of the text free region 1304. In this process a dilation operator may take two pieces of data as inputs. The first may be the image which is to be dilated. The second may be a (usually small) set of coordinate points known as a structuring element (also known as a kernel). It is the structuring element that determines the precise effect of the dilation on the input image.

Figure 15:
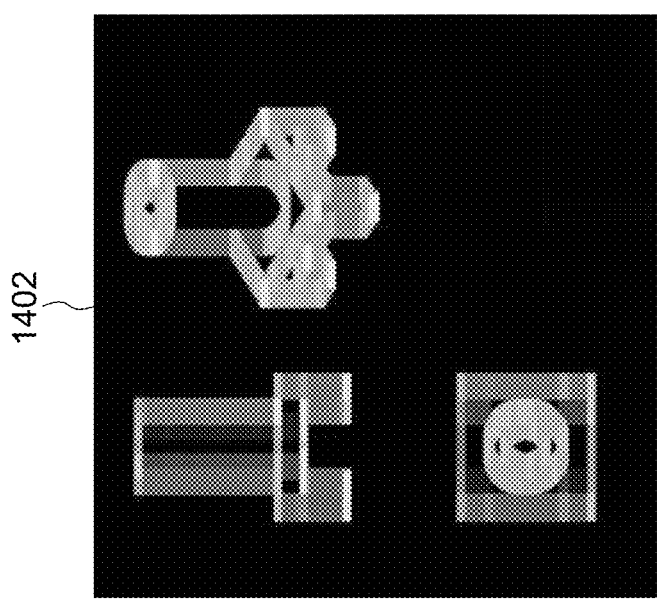
FIG. 15 illustrates an exemplary image of engineering drawing document depicting extraction of table and figure region using contour detection, in accordance with an embodiment of the disclosure.
Figure 15:
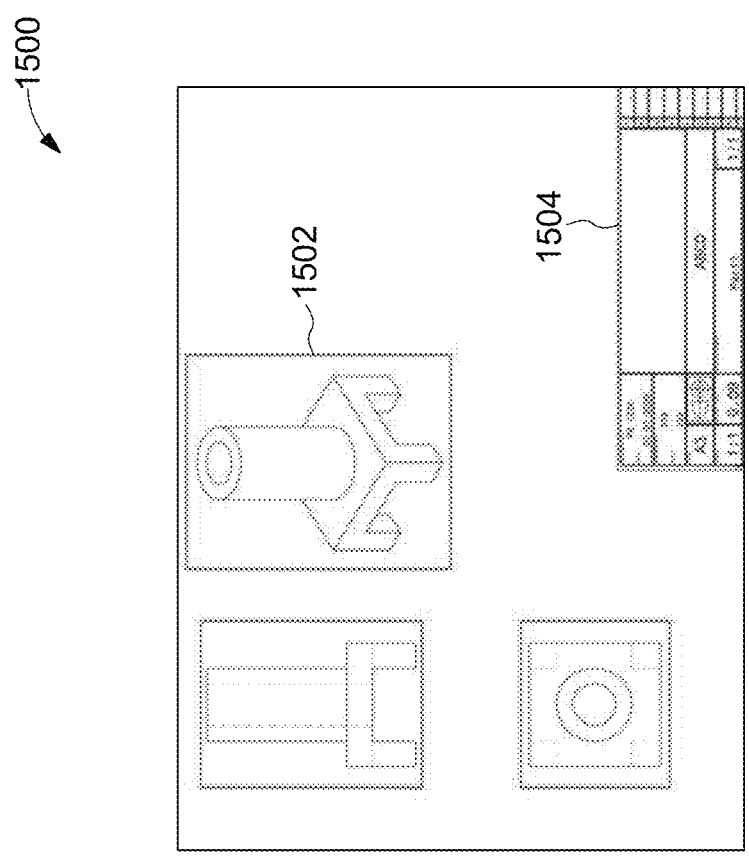

At step 428, an open-source contour image processing algorithm may further be used identify at least one figure region from the dilated text free region, using a contour-based detection technique. The figure region may be detected based on aspect ratio. It may be noted that the contour detection is the first and most important step in object recognition, and may be divided into two types: i.e., edge-based and region-based. The first category detects image edges. Based on the edge image, the contour of an object is then determined. Furthermore, at step 430, the identified figure region may be received as an output. For example, as shown in FIG. 15 an exemplary image 1500 depicting an identified figure region 1502 and table region 1504 from the dilation image 1402.

Figure 16:
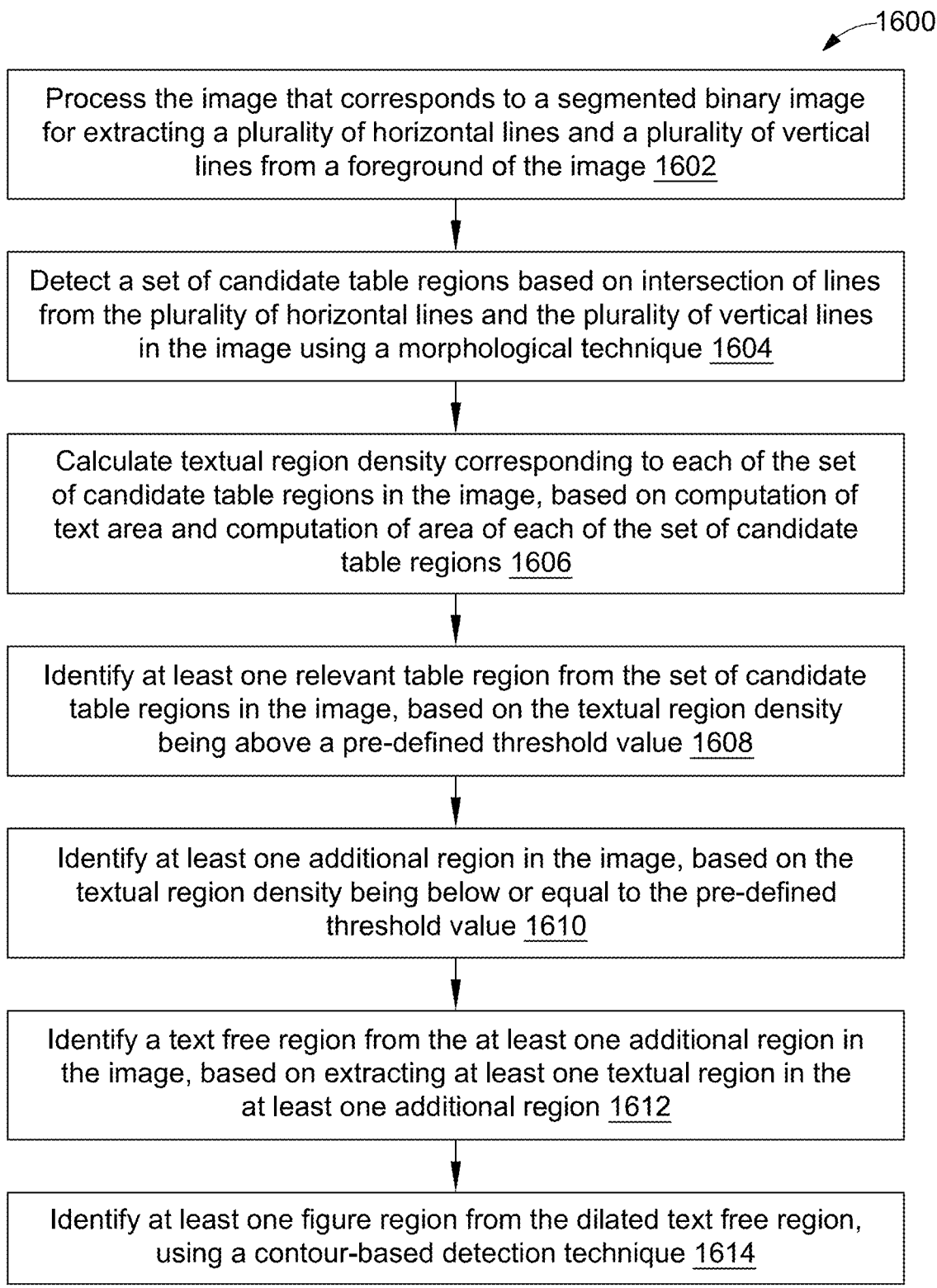
FIG. 16 illustrates a flowchart of a method for extracting tables and figures from an image of engineering drawing document is illustrated, in accordance with an embodiment of the disclosure.

Referring to FIG. 16, a flowchart of a method 1600 for extraction of table and figure region from an image is illustrated. In some embodiments, one or more steps of the method 1600 may be performed by the image processing device 302. At step 1602, the image may be processed for extracting a plurality of horizontal lines and a plurality of vertical lines from a foreground of the image. It may be noted that the image may correspond to a segmented binary image.

At step 1604, a set of candidate table regions may be detected based on intersection of lines from the plurality of horizontal lines and the plurality of vertical lines in the image using a morphological technique. Further, at step 1606, textual region density corresponding to each of the set of candidate table regions may be calculated in the image, based on computation of text area and computation of area of each of the set of candidate table regions.

At step 1608, at least one relevant table region from the set of candidate table regions may be identified in the image, based on the textual region density being above a pre-defined threshold value. In some embodiments, a plurality of table cells may be detected from the at least one relevant table region using a contour-based cell detection technique At step 1610, at least one additional region may be identified in the image, based on the textual region density being below or equal to the pre-defined threshold value. It may be noted that the at least one additional region is different from the at least one relevant table region.

At step 1612, a text free region may be identified from the at least one additional region in the image, based on extracting at least one textual region in the at least one additional region. The text free region is dilated using a morphological technique. At step 1614, at least one figure region is identified from the dilated text free region, using a contour-based detection technique.

In some embodiments, the image processing device 302 may receive a coloured image from a drawing document and then convert the coloured image into a binary image. Once the coloured image may be converted, the image processing device may further segment the binary image into the foreground and a background based on an adaptive threshold value.

The present disclosure discusses various techniques for extraction of text and figure region from an image. The technique employs an image processing algorithm for segregating table and figure region. Further, the technique provides step wise segregation of the text, table cell, table region and figure region of the input image. The techniques provide a unique solution, thereby reducing difficulty in retrieving segregated content from the drawing documents.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

It is intended that the disclosure and examples be considered as exemplary only, with a true scope and spirit of disclosed embodiments being indicated by the following claims.

What is claimed is:

1. A method of extracting tables and figures from an image, the method comprising:
    processing, by an image processing device, the image that corresponds to a segmented binary image for extracting a plurality of horizontal lines and a plurality of vertical lines from a foreground of the image;
    detecting, by the image processing device, a set of candidate table regions based on intersection of lines from the plurality of horizontal lines and the plurality of vertical lines in the image using a morphological technique;
    calculating, by the image processing device, textual region density corresponding to each of the set of candidate table regions in the image, based on computation of text area and computation of area of each of the set of candidate table regions;
    identifying, by the image processing device, at least one relevant table region from the set of candidate table regions in the image, based on the textual region density being above a pre-defined threshold value;
    identifying, by the image processing device, at least one additional region in the image, based on the textual region density being below or equal to the pre-defined threshold value, wherein the at least one additional region is different from the at least one relevant table region;
    identifying, by the image processing device, a text free region from the at least one additional region in the image, based on extracting at least one textual region in the at least one additional region, wherein the text free region is dilated using a morphological technique; and
    identifying, by the image processing device, at least one figure region from the dilated text free region, using a contour-based detection technique.

2. The method of claim 1, comprising:
    receiving a coloured image from a drawing document;
    converting the coloured image into a binary image; and
    segmenting the binary image into the foreground and a background based on an adaptive threshold value.

3. The method of claim 2, wherein the binary image is a gray scale image which is black and white in colour.

4. The method of claim 1, comprising:
    detecting a plurality of table cells from the at least one relevant table region using a contour-based cell detection technique.

5. The method of claim 1, wherein the intersection of lines from the plurality of horizontal lines and the plurality of vertical lines in the image is indicative of table cells.

6. A system for analyzing images and generating a report, the system comprising:
   a processor; and
   a memory communicatively coupled to the processor, wherein the memory stores processor-executable instructions, which, on execution, causes the processor to:
      process the image that corresponds to a segmented binary image for extracting a plurality of horizontal lines and a plurality of vertical lines from a foreground of the image;
      detect a set of candidate table regions based on intersection of lines from the plurality of horizontal lines and the plurality of vertical lines in the image using a morphological technique;
      calculate textual region density corresponding to each of the set of candidate table regions in the image, based on computation of text area and computation of area of each of the set of candidate table regions;
      identify at least one relevant table region from the set of candidate table regions in the image, based on the textual region density being above a pre-defined threshold value;
      identify at least one additional region in the image, based on the textual region density being below or equal to the pre-defined threshold value, wherein the at least one additional region is different from the at least one relevant table region;
      identify a text free region from the at least one additional region in the image, based on extracting at least one textual region in the at least one additional region, wherein the text free region is dilated using a morphological technique; and
      identify at least one figure region from the dilated text free region, using a contour-based detection technique.

7. The system of claim 6, wherein the processor-executable instructions further cause the processor to:
   receiving a coloured image from a drawing document;
   converting the coloured image into a binary image; and
   segmenting the binary image into the foreground and a background based on an adaptive threshold value.

8. The system of claim 7, wherein the binary image is a gray scale image which is black and white in colour.

9. The system of claim 6, wherein the processor-executable instructions further cause the processor to detect a plurality of table cells from the at least one relevant table region using a contour-based cell detection technique.

10. The system of claim 6, wherein the intersection of lines from the plurality of horizontal lines and the plurality of vertical lines in the image is indicative of table cells.

11. A non-transitory computer-readable medium storing computer-executable instructions for analysing images and generating a report, the computer-executable instructions configured for:
   processing the image that corresponds to a segmented binary image for extracting a plurality of horizontal lines and a plurality of vertical lines from a foreground of the image;
   detecting a set of candidate table regions based on intersection of lines from the plurality of horizontal lines and the plurality of vertical lines in the image using a morphological technique;
   calculating textual region density corresponding to each of the set of candidate table regions in the image, based on computation of text area and computation of area of each of the set of candidate table regions;
   identifying at least one relevant table region from the set of candidate table regions in the image, based on the textual region density being above a pre-defined threshold value;
   identifying at least one additional region in the image, based on the textual region density being below or equal to the pre-defined threshold value, wherein the at least one additional region is different from the at least one relevant table region;
   identifying a text free region from the at least one additional region in the image, based on extracting at least one textual region in the at least one additional region, wherein the text free region is dilated using a morphological technique; and
   identifying at least one figure region from the dilated text free region, using a contour-based detection technique.

12. The non-transitory computer-readable medium of claim 11, wherein the computer-executable instructions are configured for:
   receiving a coloured image from a drawing document;
   converting the coloured image into a binary image; and
   segmenting the binary image into the foreground and a background based on an adaptive threshold value.

13. The non-transitory computer-readable medium of claim 12, wherein the binary image is a grayscale image which is black and white in colour.

14. The non-transitory computer-readable medium of claim 11, wherein the computer-executable instructions are configured for:
   detecting a plurality of table cells from the at least one relevant table region using a contour-based cell detection technique.

15. The non-transitory computer-readable medium of claim 11, wherein the intersection of lines from the plurality of horizontal lines and the plurality of vertical lines in the image is indicative of table cells.

* * * * *